United States Patent
Banks et al.

(10) Patent No.: US 9,989,172 B2
(45) Date of Patent: Jun. 5, 2018

(54) PUMP SUCTION PIPE ASSEMBLY FOR HIGH FLOW SEWER BYPASS

(71) Applicant: BakerCorp, Seal Beach, CA (US)

(72) Inventors: Sterling Banks, San Jose, CA (US); Matt Hromatka, Martinez, CA (US)

(73) Assignee: BAKERCORP, Seal Beach, CA (US)

(*) Notice: Subject to any disclaimer, the term of this patent is extended or adjusted under 35 U.S.C. 154(b) by 52 days.

(21) Appl. No.: 14/980,453

(22) Filed: Dec. 28, 2015

(65) Prior Publication Data

US 2016/0319963 A1    Nov. 3, 2016

Related U.S. Application Data

(60) Provisional application No. 62/154,000, filed on Apr. 28, 2015.

(51) Int. Cl.
 *F16L 9/19* (2006.01)
 *E03F 5/00* (2006.01)
 *E03F 7/00* (2006.01)

(52) U.S. Cl.
 CPC ...... *F16L 9/19* (2013.01); *E03F 5/00* (2013.01); *E03F 7/00* (2013.01)

(58) Field of Classification Search
 CPC .................. F16L 9/19; E03F 3/04; E03F 5/22
 USPC ...... 138/115, 91, 92, 94, 111; 222/416, 204; 222/464.1–7; 137/152; 417/62, 234
 See application file for complete search history.

(56) References Cited

U.S. PATENT DOCUMENTS

| | | | |
|---|---|---|---|
| 4,343,195 A | | 8/1982 | Victor |
| 6,142,705 A | * | 11/2000 | Edwards .................. E02B 8/04 137/143 |
| 2005/0142012 A1 | * | 6/2005 | Padgett ................... F04B 9/105 417/437 |
| 2006/0108792 A1 | | 5/2006 | Takasaki |
| 2009/0120522 A1 | * | 5/2009 | Ziaei ...................... F02C 7/222 138/115 |

OTHER PUBLICATIONS

International Search Report and Written Opinion issued in PCT/US2016/022704 dated Jul. 21, 2016.

* cited by examiner

*Primary Examiner* — Craig Schneider
*Assistant Examiner* — David Deal
(74) *Attorney, Agent, or Firm* — Jeffer Mangels Butler & Mitchell LLP; Brennan C. Swain, Esq.

(57) ABSTRACT

A pipe assembly that includes a hollow main pipe having a top, an open bottom and a divider extending longitudinally therethrough that divides the main pipe into first and second channels, a first branch pipe in flow communication with the first channel and extending from the main pipe, and a second branch pipe in flow communication with the second channel and extending from the main pipe.

17 Claims, 6 Drawing Sheets

PUMP SUCTION PIPE ASSEMBLY FOR HIGH FLOW SEWER BYPASS

CROSS REFERENCE TO RELATED APPLICATIONS

This application claims the benefit of U.S. Provisional Application No. 62/154,000, filed Apr. 28, 2015, which is incorporated by reference herein in its entirety.

FIELD OF THE INVENTION

The present invention relates generally to a pipe assembly and system for sewer bypass.

BACKGROUND OF THE INVENTION

The present invention is used in a sewer bypass situation where a line between two manholes is being fixed. Particular, the present invention can be used where sewage is being suctioned out of the upstream manhole or the upflow manhole, and the down flow manhole is being worked on. Typical manholes include a cone and ring thereon (as shown in FIG. 1) that limit access to pipes having a diameter that is less than 23.75" (due to the 24" typical manhole diameter). In order to provide access to larger diameter pipes so that the line downstream of the manhole can be bypassed and to accomplish the acceptable velocity rate of flow through pipe(s) the top piece of the cone in the manhole has to be removed. This can be very expensive and time consuming.

BRIEF DESCRIPTION OF THE DRAWINGS

Like numerals refer to like parts throughout the several views of the drawings.

SUMMARY OF THE PREFERRED EMBODIMENTS

Figure 1:
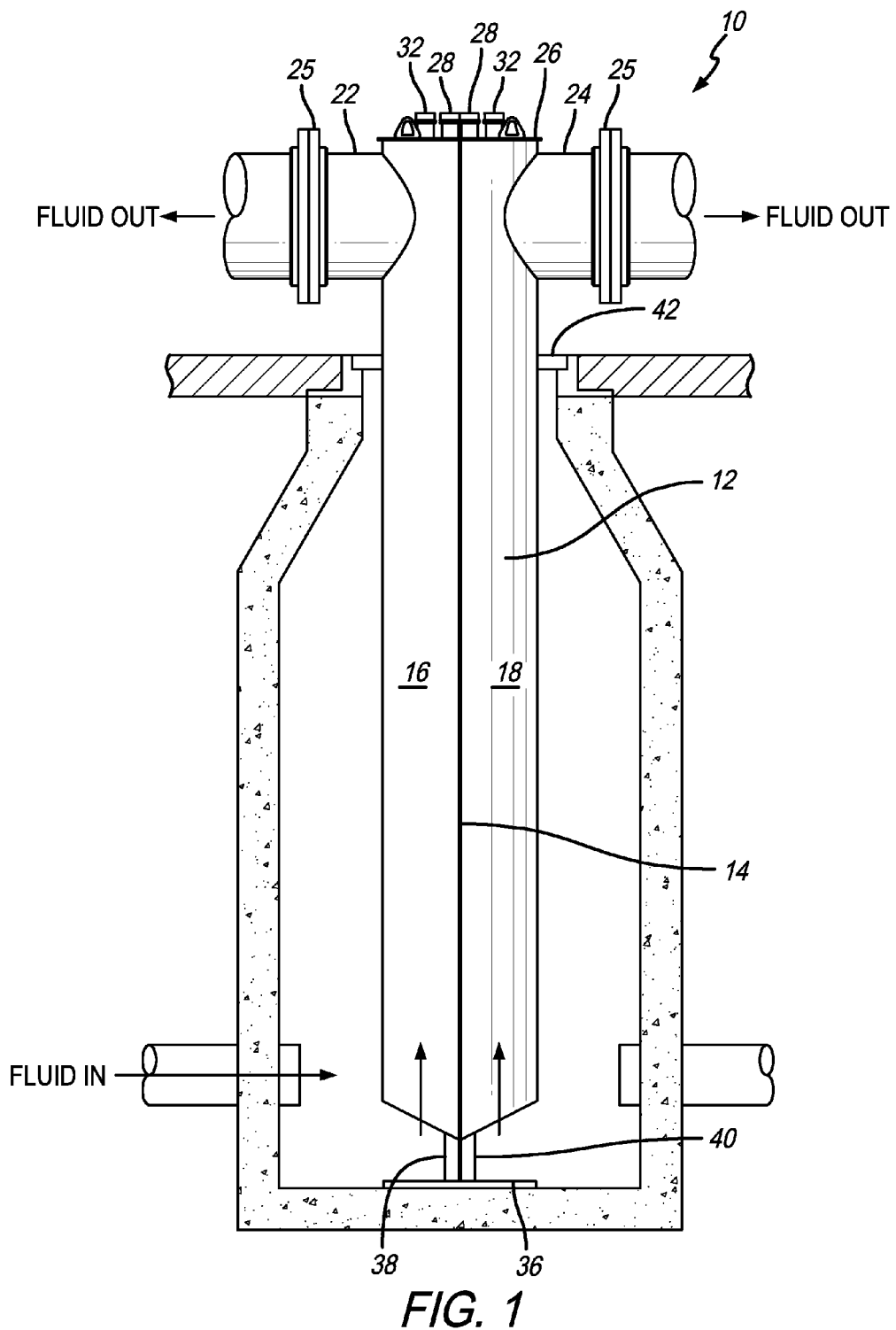
FIG. 1 is an elevational view of a pipe assembly positioned in a man hole in accordance with a preferred embodiment of the present invention.

In accordance with a first aspect of the present invention there is provided a pipe assembly that includes a hollow main pipe having a top, an open bottom and a divider extending longitudinally therethrough that divides the main pipe into first and second channels, a first branch pipe in flow communication with the first channel and extending from the main pipe, and a second branch pipe in flow communication with the second channel and extending from the main pipe. In a preferred embodiment, the pipe assembly includes a base that includes at least a first leg extending upwardly therefrom that is connected to at least one of the divider or the main pipe. Preferably, the base includes a second leg extending upwardly therefrom that is connected to at least one of the divider or the main pipe. In a preferred embodiment, the divider includes a first side and a second side, and the first leg is attached to the first side of the divider and the second leg is attached to the second side of the divider.

In a preferred embodiment, the pipe assembly includes a first transducer conduit extending through the first chamber and a second transducer conduit extending through the second chamber. The first transducer conduit includes at least one opening defined therethrough adjacent a bottom thereof and the second transducer conduit includes at least one opening defined therethrough adjacent a bottom thereof. Preferably, the pipe assembly also includes a cover on top of the main pipe. The first transducer conduit extends through the cover and includes a removable cap on a top thereof and the second transducer conduit extends through the cover and includes a removable cap on a top thereof. Preferably, the pipe assembly also includes a first vent opening in fluid communication with the first channel and a second vent opening in fluid communication with the second channel. In a preferred embodiment, the first vent opening is defined by a first vent conduit extending upwardly from the cover that includes a removable cap and the second vent opening is defined by a second vent conduit extending upwardly from the cover that includes a removable cap. Preferably, the first and second channels each comprise a generally D shaped cross-section. In a preferred embodiment, the main pipe has a generally circular cross-section and the first and second channels each have a generally semi-circular cross section.

In accordance with another aspect of the present invention there is provided a method that includes obtaining a pipe assembly that includes a hollow main pipe having a top, an open bottom and a divider extending longitudinally therethrough that divides the main pipe into first and second channels, a first branch pipe in flow communication with the first channel, and a second branch pipe in flow communication with the second channel, connecting a first pump to the first branch pipe, connecting a second pump to the second branch pipe, pumping fluid through the first channel at a first flow rate, and pumping fluid through the second channel at a second flow rate.

In a preferred embodiment, the pipe assembly includes a first transducer conduit extending through the first chamber and a second transducer conduit extending through the second chamber. The first transducer conduit includes at least one opening defined therethrough adjacent a bottom thereof and the second transducer conduit includes at least one opening defined therethrough adjacent a bottom thereof and the method further includes inserting a first transducer into the first transducer conduit and inserting a second transducer into the second transducer conduit. Preferably, the pipe assembly includes a first vent opening in fluid communication with the first channel and a second vent opening in fluid communication with the second channel and the method includes removing a cap from the first vent opening to break the suction in the first channel.

In accordance with another aspect of the present invention there is provided a sewer bypass system that includes a pipe assembly having a hollow main pipe that includes a top, an open bottom and a divider extending longitudinally therethrough that divides the main pipe into first and second channels, a first branch pipe in flow communication with the first channel and extending from the main pipe, and a second branch pipe in flow communication with the second channel and extending from the main pipe. The system also includes a first pump operatively connected to the first branch pipe, and a second pump operatively connected to the second branch pipe. The system also preferably includes a collar that at least partially surrounds and is secured to the main pipe. The collar secures the pipe assembly in a manhole.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, FIGS. 1-6 show an embodiment of a pipe assembly 10 that can be used for a high flow sewer bypass application. However, this is not a limitation on the present invention and the pipe assembly 10 can be used elsewhere.

As shown in FIG. 1, in a preferred embodiment, the pipe assembly 10 includes a hollow main pipe 12 that includes a center wall or divider 14 that divides the main pipe 12 into first and second channels 16 and 18 through which fluid, e.g., sewage, can flow (or be pumped or suctioned). The main pipe 12 includes a top, an open bottom 20 and the divider 14 extending longitudinally therethrough. The pipe assembly 10 also includes a first branch pipe 22 in flow communication with the first channel 16, and a second branch pipe 24 in flow communication with the second channel 18. Preferably, the first and second branch pipes 22 and 24 extend outwardly from the main pipe 12. They can extend transversely or perpendicularly from the axis of the main pipe 12, as shown in FIG. 1 or they can extend at a non-right angle. They can also extend opposite from one another or at an angle that is not 180 degrees from one another. Preferably, each branch pipe includes a flange 25 thereon for connection to a pipe. In another embodiment, more than two branch pipes and more than two channels associated therewith can be included.

Figure 2:
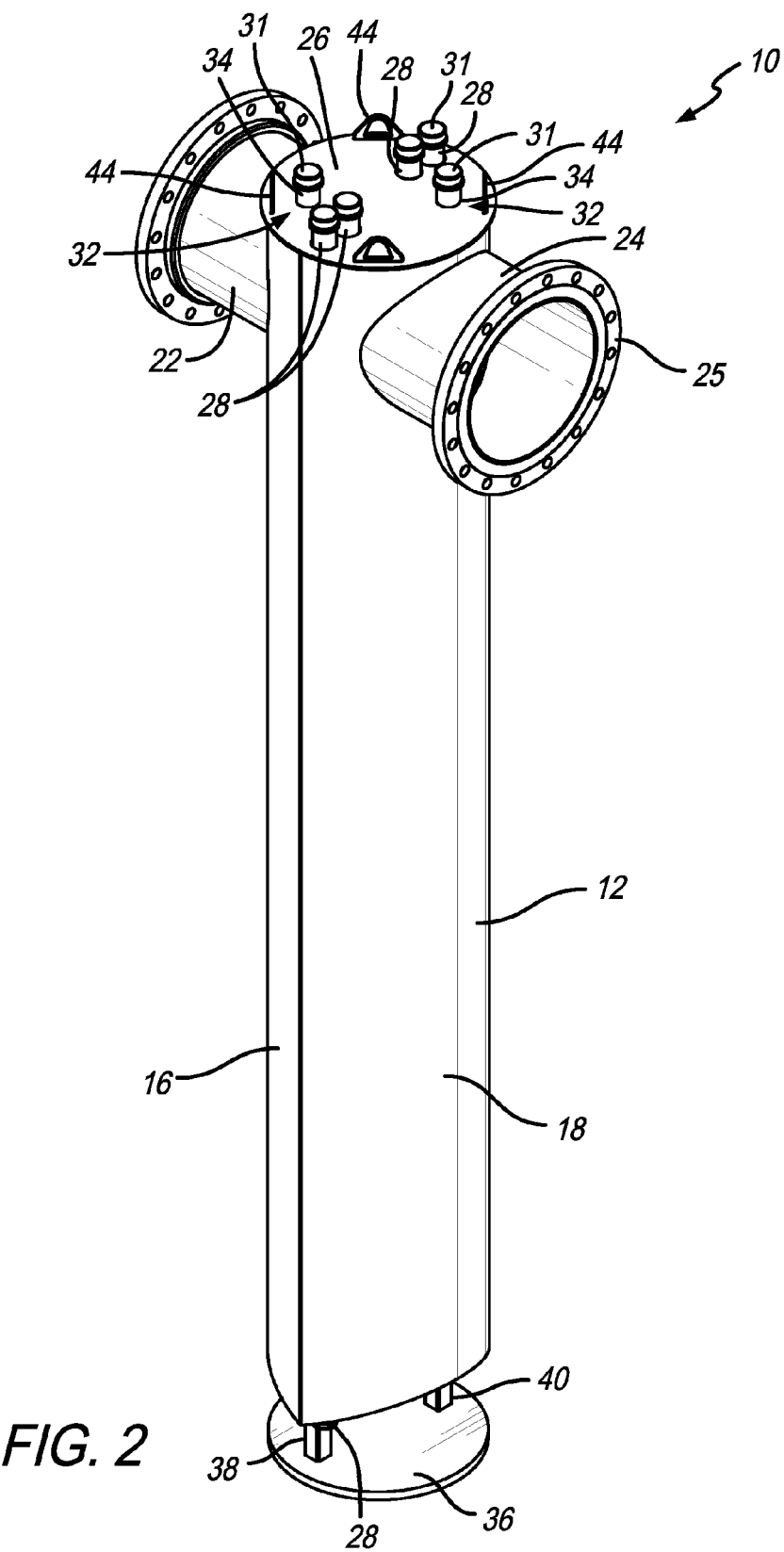
FIG. 2 is a perspective view of the pipe assembly of FIG. 1.
Figure 3:
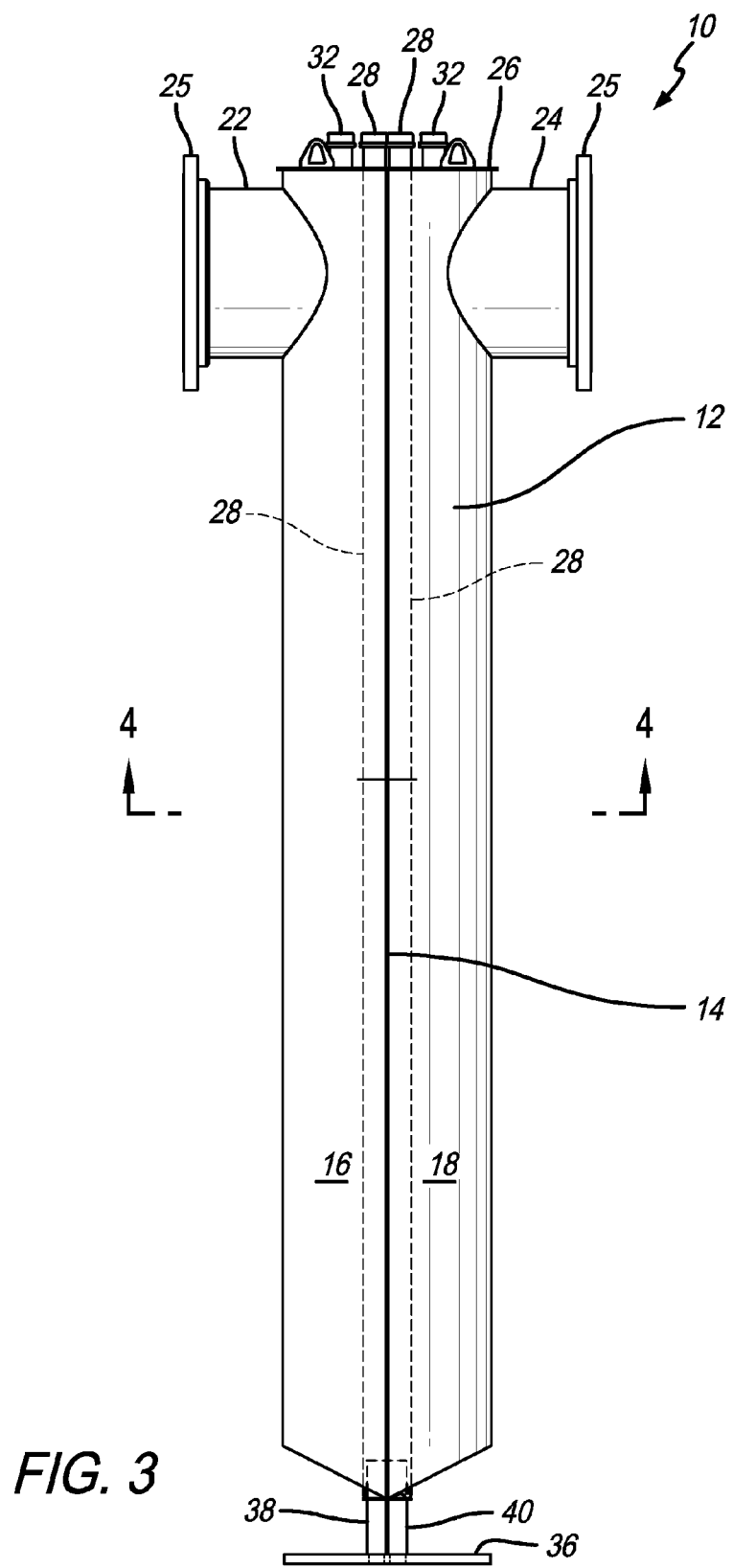
FIG. 3 is an elevational view of the pipe assembly of FIG. 1 and showing the transducer conduits in hidden.

As shown in FIGS. 1-3, in a preferred embodiment, the pipe assembly 10 includes a cover 26 that is secured on top of the main pipe 12 and defines the upper ends of the first and second channels 16 and 18. The cover can be permanently secured (e.g., by welding) or can be removable.

Figure 4:
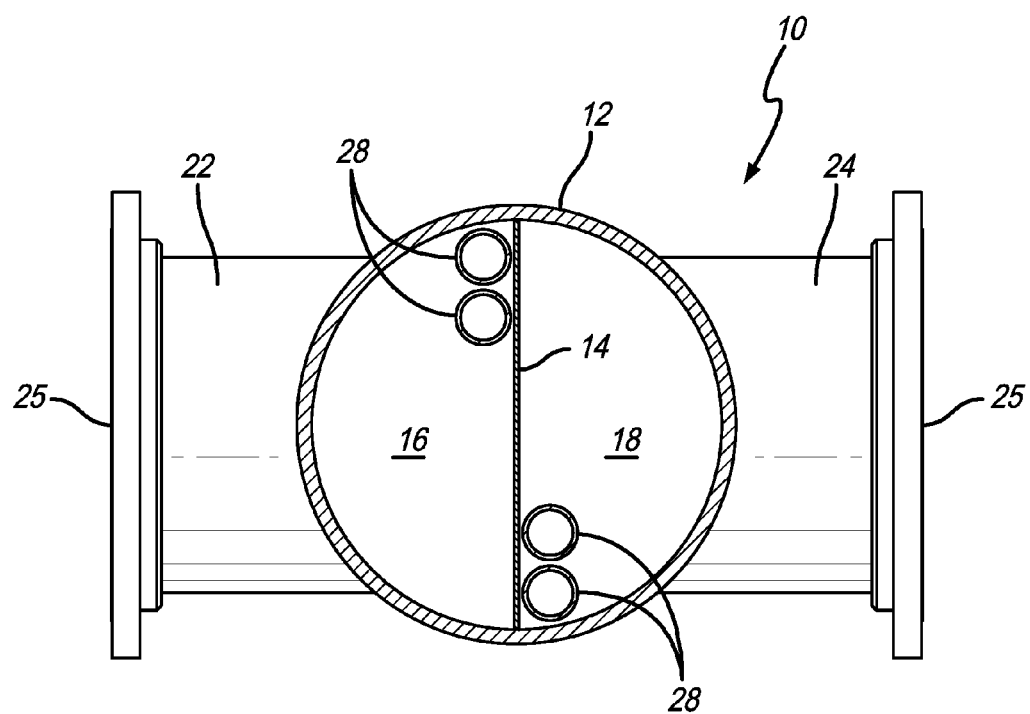
FIG. 4 is a cross-sectional view of the pipe assembly of FIG. 1 taken along line 4-4 of FIG. 3.
Figure 5:
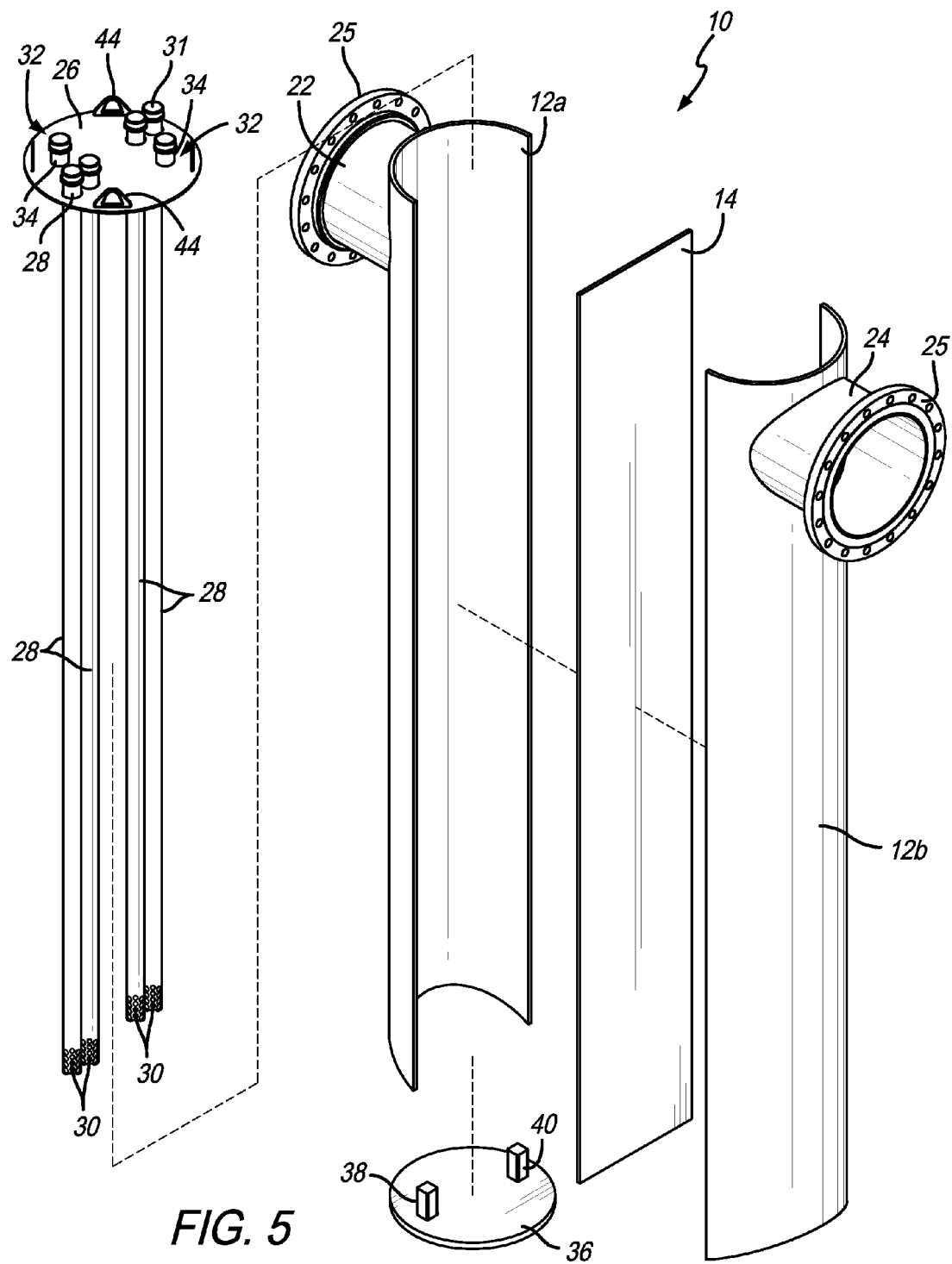
FIG. 5 is an exploded perspective view of the pipe assembly of FIG. 1.

As shown in FIGS. 4 and 5, in a preferred embodiment, the pipe assembly includes still wells or transducer conduits 28 extending therethrough. The transducer conduits 28 include a plurality of openings 30 adjacent the bottom thereof and a removable cap 31 on the top thereof. Generally, the transducer conduits communicate the first and second channels 16 and 18 with the outside of the pipe assembly so that a transducer cable 29 can be run down through the transducer conduits 28. Preferably, a portion of the transducer conduits 28 extend through the cover 26, for access from above the manhole during use. In another embodiment, the top opening of the transducer conduits 28 can be flush with the top of the cover 26. In a preferred embodiment, the first and second channels 16 and 18 each include at least one transducer conduit 28. Preferably, the first and second channels 16 and 18 each include two transducer conduits 28, as shown in FIGS. 4 and 5. In use, a transducer cable 29 (see FIG. 6) extends through the top opening of the transducer conduit 28 and down to the bottom adjacent the openings 30. The actual transducer is positioned at the bottom of the still well and the wire or cable runs out of the transducer conduit 28 and back to the pump, which is controlled based on the transducer readings. In a preferred embodiment, the transducer regulates the speed of the pump (to which the pipe assembly is attached) based on the flow. In another embodiment, the center divider can include first and second walls and that are spaced apart enough to define a tunnel therebetween (to define the transducer conduit) and through which the transducer cable(s) 29 can extend.

As shown in FIG. 5, in a preferred embodiment, each of the first and second channels 16 and 18 include a vent opening 32 associated therewith. Preferably, the vent openings 32 are defined in vent conduits 34 that extend upwardly from the cover 26 and are in fluid communication with the first and second channels 16 and 18. In use, the vent openings 32 can be used to break the suction created by the pump(s), thereby making it easier to get the pipe assembly 10 out of the manhole. The vent openings 32 can also be used for washing or flushing the first and second channels or for inspecting the pipe assembly.

As shown in FIG. 1-3, in a preferred embodiment, the pipe assembly 10 includes a base 36 for supporting the pipe assembly 10. Preferably, the base 36 includes first and second legs 38 and 40 extending upwardly therefrom that connect to at least one of the divider 14, the main pipe 12, one of the transducer conduits 28 or another structure. Any base for supporting the bottom openings of the first and second channels 16 and 18 off the ground is within the scope of the present invention. In a preferred embodiment, the height of the base 36 is adjustable. For example, the legs could be received in sleeves that that include openings therein that match openings in the legs and that allow adjustability via a pin or the like.

As shown in FIG. 1, in a preferred embodiment, the pipe assembly 10 includes a collar 42 such as a floating and locking for securing the pipe assembly 10 and adjusting the height of the pipe assembly 10 within the manhole.

FIG. 5 shows an exploded view of the pipe assembly 10. In an exemplary method of making the pipe assembly 10, the first and second halves 12a and 12b of the main pipe 12 are welded together and the divider 14 is welded down the center (this can be done in any order). In an exemplary embodiment, a 22" diameter main pipe 12 with D shaped first and second channels 16 and 18 provides a flow velocity that is approximately equal to a 16" diameter pipe on each side. This is advantageous, because two 16" diameter pipes side by side could not fit into a 24" diameter manhole.

A comparison of the flow rate provided by the prior art method with the present invention will now be described. In the example, we use two side by side pipes that are inserted into a manhole. In the example a maximum flow velocity of 10 ft/sec is used. In the example, the two pipes 80 each have an outer diameter of about 10.75" and an inner diameter of about 9.41". This yields an area of 0.483 ft$^2$ for each pipe. Q=V*A, where Q=flow rate, V=velocity and A=area. 10 ft/sec*(0.483*2) ft$^2$=9.66 ft$^3$/sec. It will be understood that 1 ft$^3$/sec=448.83 gallons per minute (GPM). Therefore, 9.66 ft$^3$/sec*448.83 GPM=4335 GPM. In short, using the two prior art pipes, a flow rate of 4335 gallons per minute is provided. As discussed above, in order to get a higher flow rate, the top cone of the manhole has to be cut out and two larger pipes can be used.

In comparison, we will use a main pipe 12 of the present invention with an outer diameter of 22" and an inner diameter of 21.250". This yields an area of 0.1165 ft$^2$ for each of the first and second halves 12a and 12b. Q=V*A. 10 ft/sec*(1.165*2) ft$^2$=23.3 ft$^3$/sec. Therefore, 23.3 ft$^3$/sec*448.83 GPM=10,457 GPM. In short, using the present invention provided two prior art pipes, a flow rate of 4335 gallons per minute is provided a flow rate 241% higher.

Figure 6:
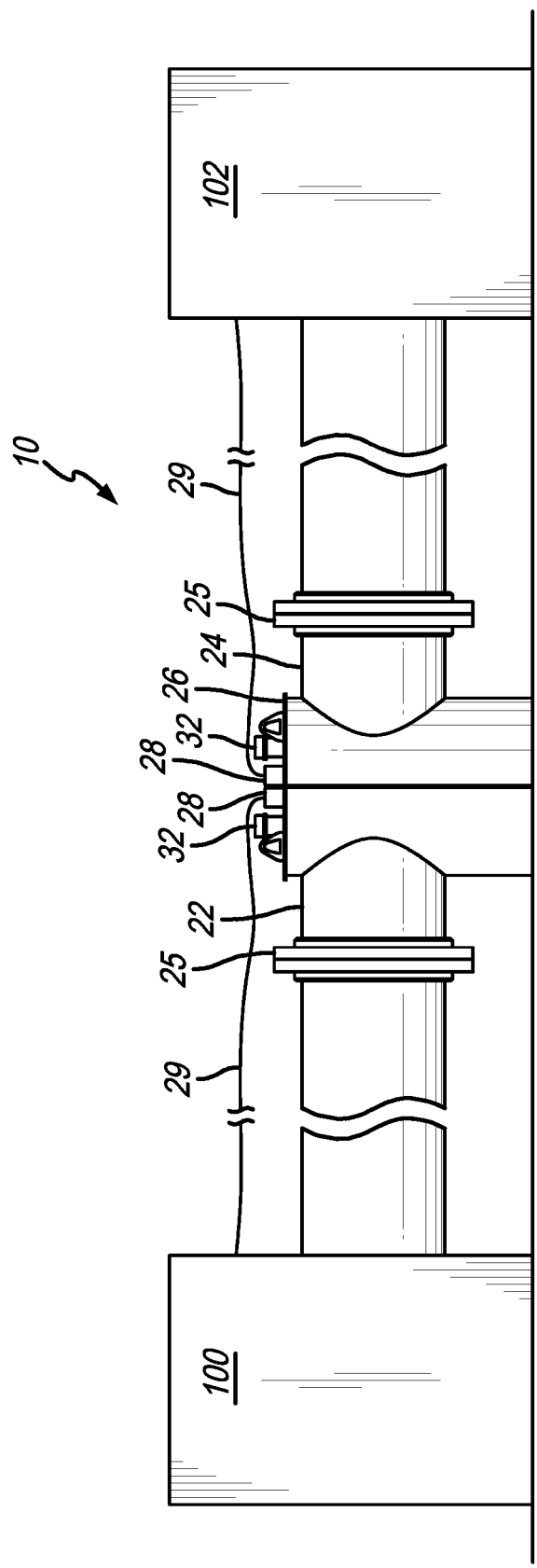
FIG. 6 is an elevational view of the pipe assembly of FIG. 1 used in conjunction with two pipes and two pumps.

An exemplary method of using the pipe assembly 10 will now be described where a first manhole downstream of a second manhole is being worked on. First, the pipe assembly 10 is inserted into the second manhole so that the base 36 rests on the bottom of the second manhole, as shown in FIG. 1. Pipes are connected to the first and second branch pipes 22 and 24 that are connected to first and second pumps 100 and 102, as shown in FIG. 6. A transducer cable that is in communication with the first pump 100 is extended down into at least one of the transducer conduits 28 in the first channel 16 and a transducer cable that is in communication with the second pump 102 is extended down into at least one of the transducer conduits 28 in the second channel 18. The first and second pumps 100 and 102 are then operated so that fluid is suctioned out of the second manhole through first and second channels 16 and 18 simultaneously. The fluid flows out of the first and second channels 16 and 18, into and through the first and second branch pipes 22 and 24 and then through the other pipes. The fluid is pumped by the first and second pumps 100 and 102 downstream bypassing the first manhole and to another location, such as a third manhole downstream of the first manhole. After the operation is complete, if necessary, the vent openings can be opened (by removing the cap) to break the suction and to make it easier to remove the pipe assembly. The pipe assembly 10 can be raised and lowered using the lugs or eyelets 44 attached to the cover 26.

It will be appreciated that modifications or changes can be made to the invention. For example, multiple smaller pipes/flanges can be added to each half of the pipe assembly (e.g., three 8" flange outlets on each side). In another embodiment, a port for liquid level indicator or alarm can be installed (e.g., radar). In another embodiment, a flow monitoring device can be included.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only examplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A pipe assembly comprising:
   a hollow main pipe that that includes a top, an open bottom and a divider extending longitudinally therethrough, wherein the divider divides the main pipe into first and second channels,
   a first branch pipe in flow communication with the first channel and extending from the main pipe, and
   a second branch pipe in flow communication with the second channel and extending from the main pipe
   a first transducer conduit extending longitudinally from the top of the main pipe through the first channel and a second transducer conduit extending longitudinally from the top of the main pipe through the second channel, wherein the first transducer conduit includes at least one opening defined therethrough adjacent a bottom thereof, and wherein the second transducer conduit includes at least one opening defined therethrough adjacent a bottom thereof.

2. The pipe assembly of claim 1 wherein the pipe assembly includes a base that extends below a bottom of the hollow main pipe that includes at least a first leg extending upwardly therefrom that is connected to at least one of the divider or the main pipe.

3. The pipe assembly of claim 2 wherein the base includes a second leg extending upwardly therefrom that is connected to at least one of the divider or the main pipe.

4. The pipe assembly of claim 3 wherein the divider includes a first side and a second side, and wherein the first leg is attached to the first side of the divider and the second leg is attached to the second side of the divider.

5. The pipe assembly of claim 1 further comprising a cover on top of the main pipe, wherein the first transducer conduit extends through the cover and includes a removable cap on a top thereof, and wherein the second transducer conduit extends through the cover and includes a removable cap on a top thereof.

6. The pipe assembly of claim 1 further comprising a first vent opening in fluid communication with the first channel and a second vent opening in fluid communication with the second channel.

7. The pipe assembly of claim 6 further comprising a cover on top of the main pipe, wherein the first vent opening is defined by a first vent conduit extending upwardly from the cover, wherein the first vent conduit includes a removable cap, wherein the second vent opening is defined by a second vent conduit extending upwardly from the cover, and wherein the second vent conduit includes a removable cap.

8. The pipe assembly of claim 1 wherein the first and second channels each comprise a generally D shaped cross-section.

9. The pipe assembly of claim 1 wherein the main pipe has a generally circular cross-section and the first and second channels each have a generally semi-circular cross section.

10. The pipe assembly of claim 1 wherein the main pipe defines a length, and wherein the divider extends from the top of the main pipe and along more than half of the length of the main pipe.

11. The pipe assembly of claim 1 wherein the divider bisects the pipe interior.

12. The pipe assembly of claim 1 wherein the divider includes first and second edges that are connected to an interior surface of the main pipe.

13. A pipe assembly comprising:
   a hollow main pipe that that includes a top, an open bottom, an interior surface that defines a pipe interior, and a divider extending longitudinally therethrough, wherein the divider includes first and second edges that are connected to the interior surface of the main pipe and divides the main pipe into first and second separate channels,
   a first branch pipe in flow communication with the first channel and extending from the main pipe,
   a second branch pipe in flow communication with the second channel and extending from the main pipe, a base that includes at least a first leg extending upwardly therefrom that is connected to the divider, a cover on top of the main pipe, a first transducer conduit extending through the first channel and the cover and a second transducer conduit extending through the second channel and the cover, wherein the first transducer conduit includes at least one opening defined therethrough adjacent a bottom thereof and a removable cap on the top thereof, and wherein the second transducer conduit includes at least one opening defined therethrough adjacent a bottom thereof and a removable cap on the top thereof, and a first conduit extending upwardly from the cover that defines a vent opening in fluid communication with the first channel and a second conduit extending upwardly from the cover that defines a second vent opening in fluid communication with the second channel.

14. The pipe assembly of claim 13 wherein the main pipe has a generally circular cross-section and the first and second channels each have a generally semi-circular cross section.

15. A method comprising the steps of:

obtaining a pipe assembly that includes a hollow main pipe that includes a top, an open bottom and a divider extending longitudinally therethrough, wherein the divider includes first and second edges that are connected to an interior surface of the main pipe and divides the main pipe into first and second separate channels, a first branch pipe in liquid flow communication with the first channel, a second branch pipe in liquid flow communication with the second channel, a first transducer conduit extending through the first channel, wherein the first transducer conduit includes at least one opening defined therethrough adjacent a bottom thereof, and a second transducer conduit extending through the second channel, wherein the second transducer conduit includes at least one opening defined therethrough adjacent a bottom thereof, connecting a first pump to the first branch pipe, connecting a second pump to the second branch pipe, pumping liquid through the first channel and into the first branch pipe at a first flow rate, pumping liquid through the second channel and into the second branch pipe at a second flow rat, inserting a first transducer into the first transducer conduit, and inserting a second transducer into the second transducer conduit.

16. A method comprising the steps of:

obtaining a pipe assembly that includes a hollow main pipe that includes a top, an open bottom and a divider extending longitudinally therethrough, wherein the divider includes first and second edges that are connected to an interior surface of the main pipe and divides the main pipe into first and second separate channels, a first branch pipe in liquid flow communication with the first channel, a second branch pipe in liquid flow communication with the second channel, a first vent opening in fluid communication with the first channel, and a second vent opening in fluid communication with the second channel, connecting a first pump to the first branch pipe, connecting a second pump to the second branch pipe, pumping liquid through the first channel and into the first branch pipe at a first flow rate, pumping liquid through the second channel and into the second branch pipe at a second flow rate, and removing a cap from the first vent opening to break a suction in the first channel.

17. A method comprising the steps of:

obtaining a pipe assembly that includes a hollow main pipe that includes a top, an open bottom and a divider extending longitudinally therethrough, wherein the divider includes first and second edges that are connected to an interior surface of the main pipe and divides the main pipe into first and second separate channels, a first branch pipe in liquid flow communication with the first channel, and a second branch pipe in liquid flow communication with the second channel, wherein the main pipe has a generally circular cross-section and the first and second channels have a generally semi-circular cross section, connecting a first pump to the first branch pipe, connecting a second pump to the second branch pipe, pumping liquid through the first channel and into the first branch pipe at a first flow rate, and pumping liquid through the second channel and into the second branch pipe at a second flow rate.

* * * * *